United States Patent [19]
Shimizu

[11] Patent Number: 5,926,184
[45] Date of Patent: Jul. 20, 1999

[54] POLYGON SORTING ORDERED BY GROUPING ACCORDING TO DISTANCES IN SORTING GROUPS

[75] Inventor: Yusuke Shimizu, Tokyo, Japan

[73] Assignee: Sega Enterprises Ltd., Tokyo, Japan

[21] Appl. No.: 08/887,503

[22] Filed: Jul. 2, 1997

Related U.S. Application Data

[63] Continuation of application No. 08/394,838, Feb. 27, 1995, abandoned.

[30] Foreign Application Priority Data

Mar. 1, 1994 [JP] Japan .................................. 6-056723

[51] Int. Cl.$^6$ .................................................. G06T 15/40
[52] U.S. Cl. ............................................................ 345/422
[58] Field of Search ........................................ 345/419–426

[56] References Cited

U.S. PATENT DOCUMENTS

| | | | |
|---|---|---|---|
| 4,821,210 | 4/1989 | Rumbaugh | 345/421 |
| 4,945,500 | 7/1990 | Deering | 364/522 |
| 5,086,496 | 2/1992 | Mulmuley | 345/421 |
| 5,155,813 | 10/1992 | Donoghue et al. | 345/179 |
| 5,193,207 | 3/1993 | Vander Vegt et al. | 395/800 |
| 5,377,117 | 12/1994 | Yamamoto et al. | 364/474.22 |
| 5,459,822 | 10/1995 | Izawa et al. | 395/122 |
| 5,493,644 | 2/1996 | Thayer et al. | 395/122 X |
| 5,522,018 | 5/1996 | Takeda et al. | 395/122 |
| 5,537,520 | 7/1996 | Doi et al. | 345/422 |
| 5,583,974 | 12/1996 | Winner et al. | 345/422 |

FOREIGN PATENT DOCUMENTS

| | | |
|---|---|---|
| 0529658 | 8/1992 | European Pat. Off. . |
| 0531157 | 9/1992 | European Pat. Off. . |

OTHER PUBLICATIONS

Foley et al., Computer Graphics: Principles and Practice, 1990, pp. 4–6, 668–697.
Dalesin et al., Rendering CSG Models with a ZZ Buffer, Computer Graphics, v.24, n.4, Aug. 1990, pp. 67–76.
Foley et al., Computer Graphics: Principles and Practice, 1990, pp. 472–475, 656–665.
Aho et al., The Design and Analysis of Computer Algorithms, pp. 55–69, 1974.
"A Simple Out–putSensitive Algorithm for Hidden Surface Removal", M. Sharir et al., ACM Transactions On Graphics, vol. 11, No. 1, Jan. 1, 1992, pp. 1–11.

*Primary Examiner*—Anton Fetting
*Attorney, Agent, or Firm*—Price, Gess & Ubell

[57] ABSTRACT

A sorting method is employed to draw data for polygons in a frame memory provided in a video game machine. The order in which the polygon data are to be drawn in the frame buffer memory is determined. For this, the polygon data are sorted. Data, for polygons, that include values on the first three-dimensional coordinates are divided into groups by employing distances between two points; from a predetermined point on the first three-dimensional coordinates to a point on the first three-dimensional coordinates in consonance with the coordinates of individual polygons Then, the order in which polygons are drawn in the frame buffer memory by employing the data for the polygons that belong to the individual groups is determined to be the order beginning with a group that has the largest or smallest distance between the two points. Through the above described procedures, the high speed sorting of the data for polygons is possible. At the same time, a memory area for the storage of data for polygons can be reduced.

9 Claims, 11 Drawing Sheets

| GROUP | DISTANCE |
|---|---|
| A | 0~1 |
| B | 1~2 |
| C | 2~3 |
| D | 3~4 |
| E | 4~5 |

FIG. 5

| No. | DISTANCE |
|---|---|
| 1 | 0.5 |
| 2 | 2.3 |
| 3 | 0.8 |
| 4 | 1.1 |
| 5 | 4.2 |
| 6 | 3.3 |
| 7 | 3.5 |
| 8 | 4.9 |
| 9 | 1.4 |
| 10 | 0.3 |

| VRAM Adr. | DATA No. | LINKING DESTINATION |
|---|---|---|
| V0 | none | none |
| V1 | 1 | none |

FIG. 8B

| BLOCK | START (VRAM Adr.) | END (VRAM Adr.) |
|---|---|---|
| A | V1 | V1 |
| B | none | none |
| C | none | none |
| D | none | none |
| E | none | none |

FIG. 9A

| VRAM Adr. | DATA No. | LINKING DESTINATION |
|---|---|---|
| V0 | none | none |
| V1 | 1 | none |
| V2 | 2 | none |

FIG. 9B

| BLOCK | START (VRAM Adr.) | END (VRAM Adr.) |
|---|---|---|
| A | V1 | V1 |
| B | none | none |
| C | V2 | V2 |
| D | none | none |
| E | none | none |

FIG. 10A

| VRAM Adr. | DATA No. | LINKING DESTINATION |
|---|---|---|
| V0 | none | none |
| V1 | 1 | V3 |
| V2 | 2 | none |
| V3 | 3 | none |

FIG. 10B

| BLOCK | START (VRAM Adr.) | END (VRAM Adr.) |
|---|---|---|
| A | V1 | V3 |
| B | none | none |
| C | V2 | V2 |
| D | none | none |
| E | none | none |

FIG. 11A

| VRAM Adr. | DATA No. | LINKING DESTINATION |
|---|---|---|
| V0 | none | none |
| V1 | 1 | V3 |
| V2 | 2 | none |
| V3 | 3 | V10 |
| V4 | 4 | V9 |
| V5 | 5 | V8 |
| V6 | 6 | V7 |
| V7 | 7 | none |
| V8 | 8 | none |
| V9 | 9 | none |
| V10 | 10 | none |

FIG. 11B

| BLOCK | START (VRAM Adr.) | END (VRAM Adr.) |
|---|---|---|
| A | V1 | V10 |
| B | V4 | V9 |
| C | V2 | V2 |
| D | V6 | V7 |
| E | V5 | V8 |

| VRAM Adr. | DATA No. | LINKING DESTINATION |
|---|---|---|
| V0 | none | V5 |
| V1 | 1 | V3 |
| V2 | 2 | V4 |
| V3 | 3 | V10 |
| V4 | 4 | V9 |
| V5 | 5 | V8 |
| V6 | 6 | V7 |
| V7 | 7 | V2 |
| V8 | 8 | V6 |
| V9 | 9 | V1 |
| V10 | 10 | END |

POLYGON SORTING ORDERED BY GROUPING ACCORDING TO DISTANCES IN SORTING GROUPS

This is a continuation of application Ser. No. 08/394,838, filed on Feb. 27, 1995 (abandoned).

BACKGROUND OF THE INVENTION

1. Field of the Invention

The present invention relates to a method for sorting data for polygons and a game machine that employs the method; and in particular, the present invention relates to a method by which a memory area for storing data for polygons can be reduced and high speed sorting of the data for polygons can be performed, and to a game machine that employs that method.

2. Related Arts

In recent video game machines, to provide more realism for users, a figure that is expressed by three-dimensional coordinates is considered as an integrated assembly of a plurality of polygons, and three-dimensional coordinate data for each polygon are transformed into two-dimensional coordinate data for a display device, such as a CRT, that has a two-dimensional display plane. The video game machines use the transformed two-coordinate data for a display on a two-dimensional display plane.

To display polygons in such video game machines, the order in which polygons are to be drawn in a frame buffer memory must be determined based on their relative distances in the direction of the depth of a screen. That is, it is necessary to register data for each polygon in a memory, to sort the data for drawing and read them in the order that corresponds to their relative distances in the direction of the depth of a screen, beginning with data having the greatest distance and to employ the data to draw polygons in the frame buffer memory.

To do this, Quick-Sort, or other sorting sequences are conventionally employed as general sorting methods. By employing such a method, the coordinates of all the polygons are transformed, and the obtained data for polygons are sorted and stored in the order that corresponds to their relative distances in the direction of the depth of a display screen.

With such a general method, after the coordinates of all the polygons are transformed for sorting, it is necessary for the obtained data to be temporarily stored in a memory.

Therefore, a separate, large-capacity memory area is required for the storage of the transformed data. In addition, a procedure is required for the sorting of all the transformed data in descending order from the furthest distance in the direction of depth of a display screen. As the sorting process takes much time, the above described general sorting method is not appropriate for video game machines for which high speed processing is required.

Further, it is of the same situation as the above regarding sorting data for polygons that the data sorted are read out and drawn in a frame memory in the order that corresponds to their relative distances in the direction of the depth of a screen, beginning with data having the smallest distance.

SUMMARY OF THE INVENTION

It is, therefore, an object of the present invention to provide both a sorting method for data for polygons that can reduce the size of the memory that is used and that can shorten the time required for sorting, and a video game machine that can employ that method.

It is another object of the present invention to provide both a sorting method for data for polygons by which the order in which polygons are to be drawn in a frame buffer memory can be determined, and a video game machine that can employ that method.

It is an additional object of the present invention to provide both a sorting method for data for polygons by which parallel processing can be performed when a DSP or a plurality of processors is employed, and a video game machine that can use that method.

It is a further object of the present invention to provide both a sorting method for data for polygons, by which not only can drawing data be registered in a video RAM but also a linked list can be formed, using hardware jump commands, for which merely a block table need be prepared in a work RAM, that enables the generation of polygon drawing commands while a sorting process is being performed, and a video game machine that can employ that method.

It is still another object of the present invention to provide a sorting method, for data for polygons, comprising: a first step of grouping polygons, and the data for them, which include coordinate values for first three-dimensional coordinates, in consonance with the distances between two points, a predetermined point represented by first three-dimensional coordinates and, for each of the polygons, another point represented by first three-dimensional coordinates that correspond to the coordinate values in the data for the polygon; and a second step of using the data to draw, in a frame buffer memory, the polygons, which belong to the groups that are formed at the first step, that are included in a specific group, beginning with that group for which the distance between the two points is the greatest or smallest.

It is a still further object of the present invention to provide a video game machine, which includes a sorting function for polygons, and data for them, that determines the order in which the polygons will be drawn in a frame buffer memory, that comprises: a CPU for executing a game program and for, during the execution of the game program, grouping the polygons and the data for them, which include coordinate values for first three-dimensional coordinates, based on distances between two points, a predetermined point represented by first three-dimensional coordinates and, for each of the polygons, another point represented by first three-dimensional coordinates that correspond to the coordinate values in the data for the polygons; a frame buffer memory for storing drawing data that is to be displayed; and a video RAM for the drawing, in the frame buffer memory, of polygons that correspond to the polygons, and the data for them, that are formed into groups that are arranged in descending order beginning with that group for which the distance between the two points is the greatest or smallest.

DESCRIPTION OF THE PREFERRED EMBODIMENTS

Before the preferred embodiments of the present invention are described, the principle of the present invention will now be explained, while referring to FIG. 1, in order that the present invention may be correctly understood. The same reference numbers and symbols are used to denote identical or corresponding components in the following drawings.

Figure 1:
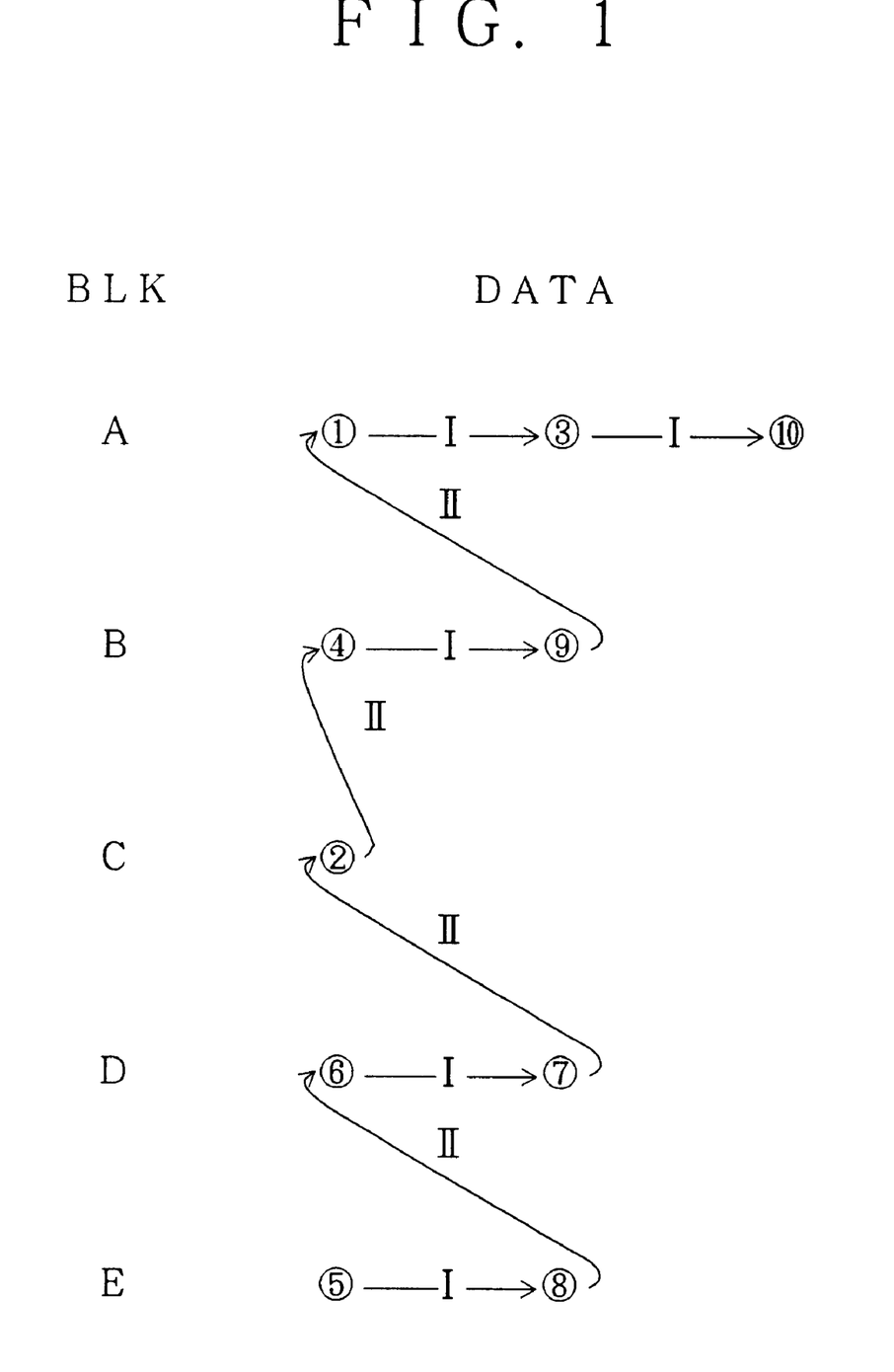
FIG. 1 is a diagram for explaining the principle of the present invention.

In FIG. 1, A through E denote a plurality of blocks (BLKS) that are grouped together. The entries No. 1 through No. 10 denote data for those polygons that are to be displayed, with the numerals 1 through 10 corresponding to the order in which data are read from a game program and processed.

Data for polygons that are read from the game program are grouped in accordance with the distance of the polygons between two points: a predetermined coordinate point and a coordinate position for each polygon. The data groups are registered to corresponding blocks A through E. For example, the data for polygons No. 1, No. 3, and No. 10 are registered as belonging to block A.

In the process by which polygons and the data for them, which are assembled into groups, are registered in corresponding blocks, the registration of link connection (I) is performed in the blocks in accordance with the order in which the polygons and the data for them are registered. For example, in block A, the link connection is performed in the order that begins with the data for polygon No. 1 followed by the data for polygon No. 3 and then No. 10.

When the data for all the polygons have been grouped and registered in the corresponding blocks, the registration of the linked connection (II) between the blocks is performed.

As is shown in FIG. 1, polygon data No. 8, which has been registered last in block E, is linked to polygon data No. 6, which has been registered first in block D. Polygon data No. 7, which has been registered last in block D, is linked to polygon data No. 2 in block C. Polygon data No. 2 in block C is linked to polygon data No. 4, which has been registered first in block C. Polygon data No. 9, which has been registered last in block B, is linked to polygon data No. 1, which has been registered first in block A.

When all the polygon data have been sorted in the above described manner, the data for the polygons are read out in the order in which they are linked together and the polygons are drawn in a frame buffer memory.

In FIG. 1, the linked connection (II) between the blocks are registered in the order of the distances between two coordinate positions of data for polygons. Namely, the order of drawing data for polygons begins with the group for which the distance between the two positions is the greatest, in the case that the data are read out and drawn in a frame buffer memory in the order of the linked connections.

However, the order of drawing data for polygons in a frame buffer memory according to the present invention is not restricted to the above, and it is also possible to read out and draw the data for polygons in the frame buffer memory in the order beginning with the group for which the distance between the two positions is the smallest.

In this case, it is not necessary to draw again data on the portions in a frame buffer memory, which have been already drawn and therefore, the speed of drawing the data in the frame buffer memory may become fast.

Figure 2:
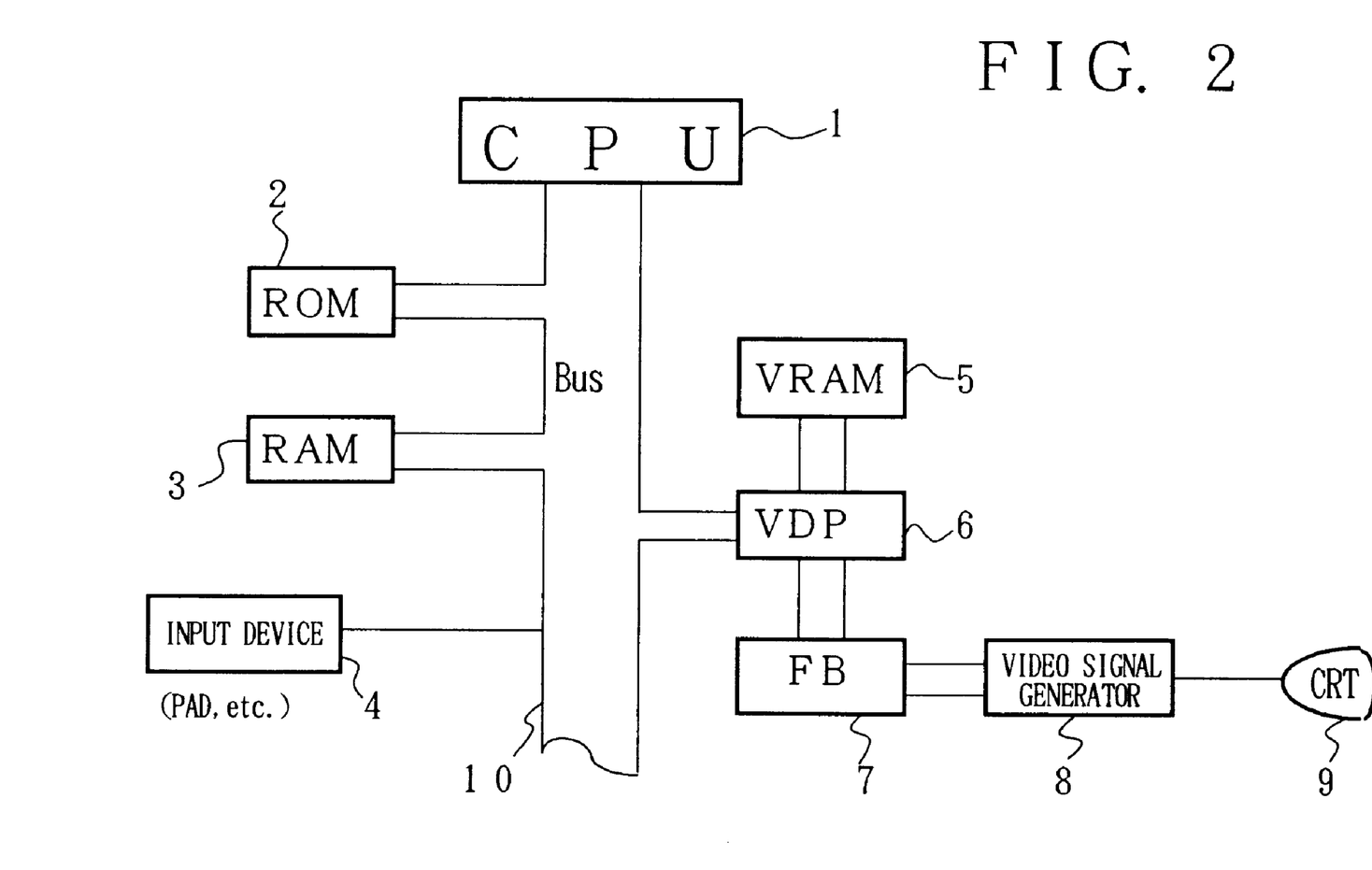
FIG. 2 is a block diagram illustrating a machine according to one embodiment for which the present invention is applied.

FIG. 2 is a block diagram illustrating a video game machine, according to one embodiment, that employs a method of the present invention according to the above described principle. In FIG. 2, a CPU 1 executes a game program that is stored in a ROM 2.

The CPU 1 performs a transformation process where data for polygons at three-dimensional coordinates (referred to as second three-dimensional coordinates in this application), which are represented, for example, by global coordinates that will be described later, are transformed into other three-dimensional coordinate data (referred to as first three-dimensional coordinates in this application); and executes a sorting process. For an application of the present invention, the coordinate system employed for the first and the second three-dimensional coordinates may be either the polar or the spherical coordinate system.

In the ROM 2 are a control program for executing a game, and data for polygons that are represented by, for example, the second three-dimensional coordinates.

The polygon data include XYZ coordinate data for the vertexes of the polygons on the second three-dimensional coordinates (i.e., for a polygon with four vertexes as an example, XYZ coordinate data that correspond to the individual vertexes of the polygon), color data (only luminance data when it is for monochrome), and a coordinate-transformation parameter, which is employed to form a transformation expression for transforming second three-dimensional XYZ data into first three-dimensional X1Y1Z1 data, while a specific point, such as the point of view of a player, is employed as an origin.

In a work RAM 3, data are temporality stored while a game is being executed. Also, a table (hereafter referred to as a "BLK-TBL") is provided for performing the method of the present invention that will be described later.

An input device 4, such as a joy stick, is operated by a game player to input required data when the controlled shifting of a sprite is involved, etc.

In a video RAM (VRAM) 5 are stored polygon data that are obtained by transforming their coordinates into the first three-dimensional coordinates using the method of the present invention. The data for polygons that are stored in the video RAM 5 are X1Y1Z1 coordinate data for the vertexes of a polygon that is to be displayed, and color data (only luminance data are required for a monochrome display). A command table is also provided in the video RAM 5 to perform the method of the present invention, which will be described later.

A video display processor (VDP) 6, which is activated at the time image frames are switched, processes data, for polygons, that are stored in the video RAM 5, and draws figures in a frame buffer memory (FB) 7 in consonance with the pixel data for one screen.

The frame buffer memory 7 has two pages. Pixel data for one screen that are written and stored in one memory page are read out in order and displayed in a display device 9. During this period, pixel data for one page are written and stored in the other memory page.

In other words, the two pages of the frame buffer memory 7 are used for alternately reading and writing data, so that sequential screens can be displayed on a monitor.

Data for polygons for one screen that are stored in the frame buffer memory 7 serve as data for the individual pixels (dots).

A video signal generator 8 reads the pixel (dot) data that are written to and stored in the frame buffer memory 7 and converts these data into video signals. The video signals from the video signal generator 8 are transmitted to the display device 9, such as a CRT.

According to the principle involved in the display of a plurality of polygons, which constitutes a display screen, on a two-dimensional display device 9, such as a CRT, in the frame buffer memory 7 polygons are sequentially drawn and drawn over beginning with that polygon that is positioned the furthest from the first three-dimensional coordinate origin, for example, from the point of view of a player. This is done because it prevents a nearer polygon from being hidden by a polygon that is more distant in the direction of the depth of a screen.

Figure 3:
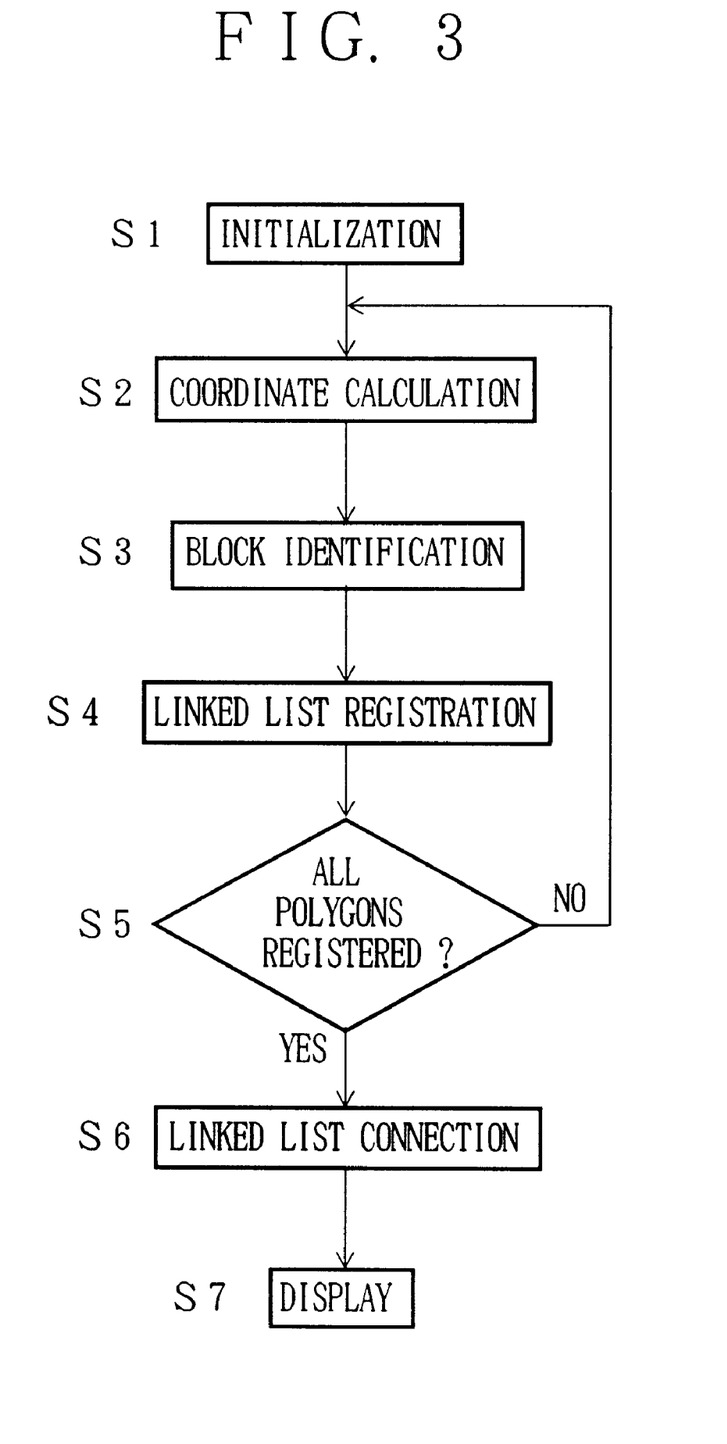
FIG. 3 is a flowchart showing the processing for a method according to one embodiment of the present invention.

FIG. 3 is a flowchart showing the processing, for one embodiment according to the method of the present invention, by which is provided such a display. During an initialization process (step S1), performed first is coordinate calculation, by which polygon data of the second three-dimensional coordinates are transformed, with the use of transformation parameter, into the first three-dimensional coordinates that have, for example, the point of view of a player as an origin; then a sorting process; and after that the setting of the video RAM 5 to its the initial state.

After the initializations the second three-dimension coordinates are transformed into the first three-dimensional coordinates (step S2). In this transformation, which is performed under the control of the CPU 1, polygon data, such as global coordinates, which are the second three-dimensional coordinates that are included in a game program, are transformed, by using a transformation parameter that is also included in the game program, into data for polygons for the first three-dimensional coordinate that employs the point of view of a player as an origin.

Following in sequence, block identification is performed (step S3). The contents of the block identification (step S3) are as follows. According to the present invention, data for polygons that are obtained by performing the transformation into the first three-dimensional coordinates are grouped according to distance in the direction of, for example, the Z1 axis.

At this time, it is possible to employ a method that adopts the average value of the distances of a plurality of vertexes of individual polygons in the direction of the Z1 axis, or a method that adopts the representative distance value of one of the vertexes, i.e., the shortest distance value for a vertex in the direction of the Z1 axis.

Figure 4:
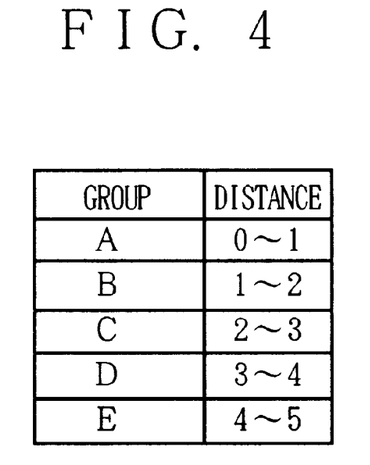
FIG. 4 is a diagram illustrating an example where polygon data are divided into groups.

FIG. 4 is a table for explaining a group example where data for polygons are divided into a plurality of blocks (A through E) according to different distances in the direction of the Z1 axis. That is, distance 0 to 1 in the direction of the Z1 axis is group A, distance 1 to 2 is group B, distance 2 to 3 is group C, distance 3 to 4 is group D; and distance 4 to 5 is group E.

Figure 5:
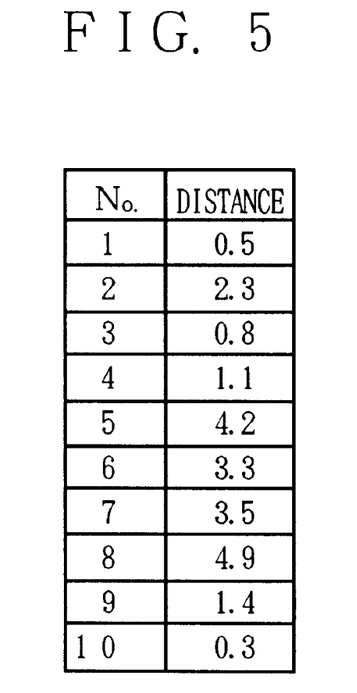
FIG. 5 is a diagram showing a distance example for the data for polygons in the direction of a Z1 axis.

FIG. 5 is a table for explaining an example of distance data, where ten polygons (No. 1 through No. 10) are supposed to be displayed and their distances in the direction of the Z1 axis are shown. For example, polygon 1, which has a distance of 0.5 in the direction of the Z1 axis, belongs to group A (see FIG. 4). Similarly, polygon 6, which has a distance of 3.3 in the direction of the Z1 axis, belongs to group D.

As described above, the distances of the polygons in the direction of the Z1 axis are obtained by employing, for all the polygons in common, the average of the distances of a plurality of vertexes of each polygon in the direction of the Z1 axis, or the shortest distance of the vertex in the direction of the Z1 axis.

Figure 6A:
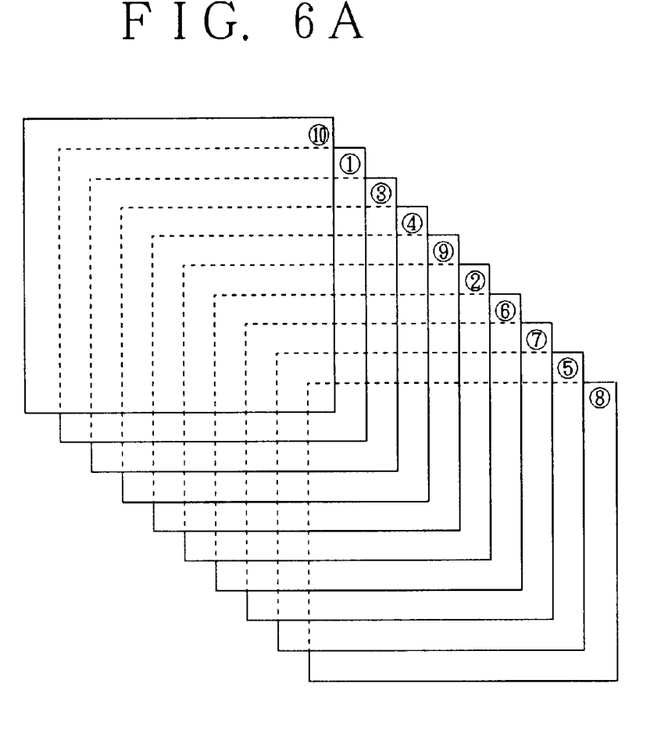
FIGS. 6A and 6B are explanatory diagrams for data for polygons that correspond to FIGS. 4 and 5.
Figure 6B:
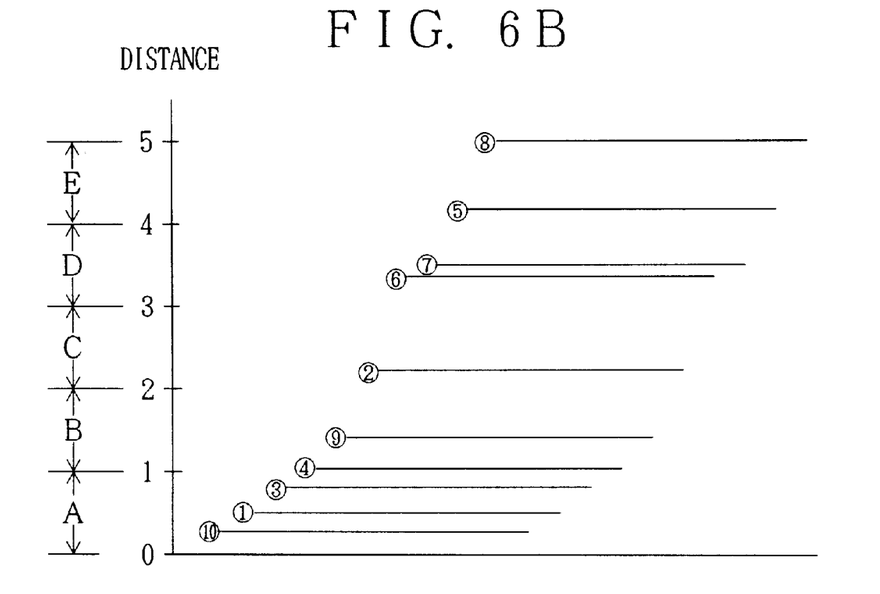

FIGS. 6A and 6B are diagrams for explaining data for polygons relative to FIGS. 4 and 5. FIG. 6A is a diagram in which polygons No. 1 through No. 10, which have four vertexes, are arranged in the order of their distances along the Z1 axis. FIG. 6B, a graph in which the vertical line indicates distances in the direction of the Z1 axis and the horizontal line indicates the positions of polygons, shows the relationship between the distances for the polygons in the direction of the Z1 axis, which are explained while referring to FIG. 5, and groups A through E.

The order of the numerals of polygons No. 1 through No. 10 corresponds to the order of the data for polygons that are read by the CPU 1 from a game program that is stored in the ROM 2, and are transformed into the first three-dimensional coordinates by employing the transformation parameter, which is included in the game program.

After the grouping process by block identification has been performed (step S3, see FIG. 3), linked list registration is performed (step S4).

Figure 7:
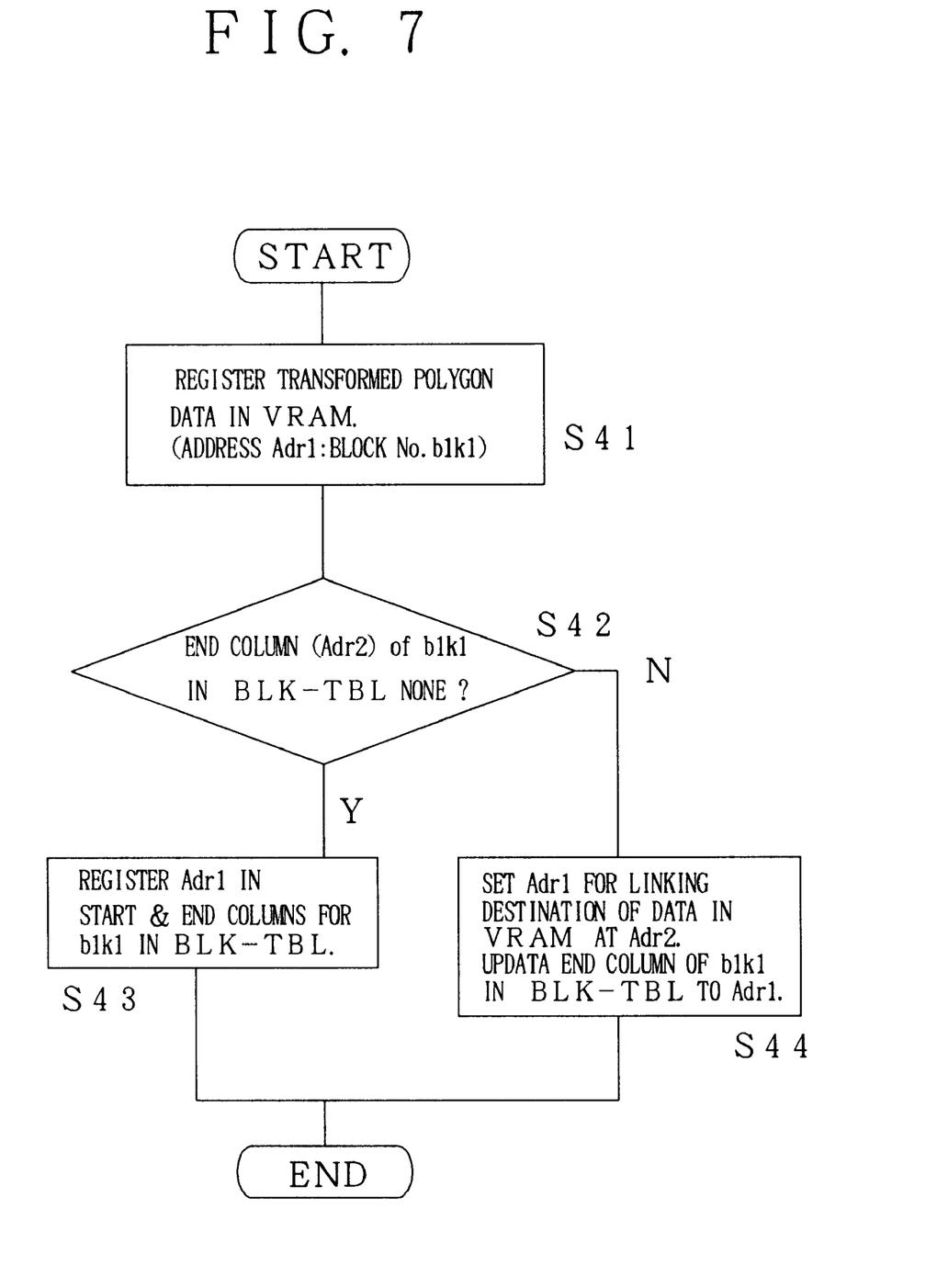
FIG. 7 is a flowchart showing the procedures for registering a linked list.

FIG. 7 is a flowchart showing the detailed procedures for registering the linked list (step S4). FIGS. 8A through 11B are diagrams for explaining the statuses of the registration in the video RAM 5 and the work RAM 3 during the linked list registration (step S4).

Figure 8A:
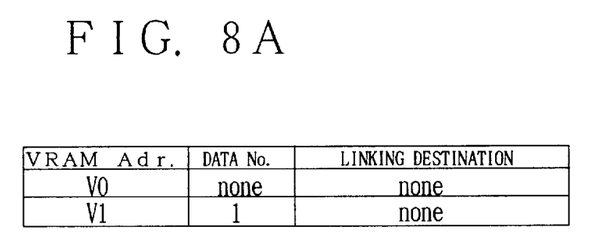
FIGS. 8A and 8B are diagrams for explaining registration state 1 of a linked list.
Figure 9A:
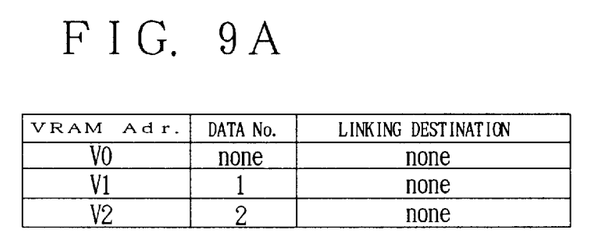
FIGS. 9A and 9B are diagrams for explaining registration state 2 of a linked list.
Figure 10A:
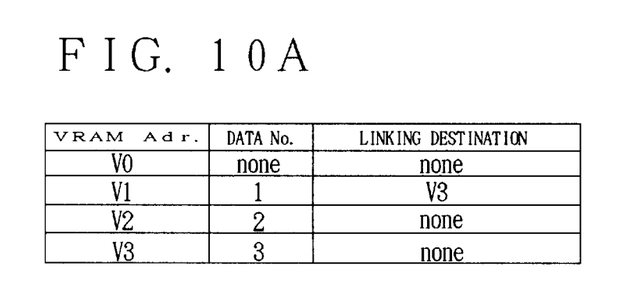
FIGS. 10A and 10B are diagrams for explaining registration state 3 of a linked list.

In FIGS. 8A, 9A, and 10A are shown the contents that are to be registered in a command table that is prepared in the video RAM 5. Addresses in the video RAM 5 (VRAM Adr.), the number of the data (Data No.), for a polygon, that are to be stored at that address, and linking destination addresses are indicated.

Figure 8B:
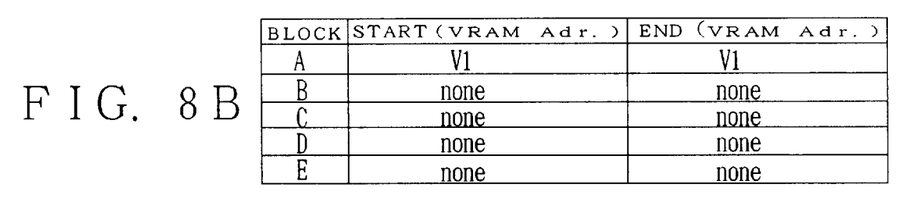
Figure 9B:
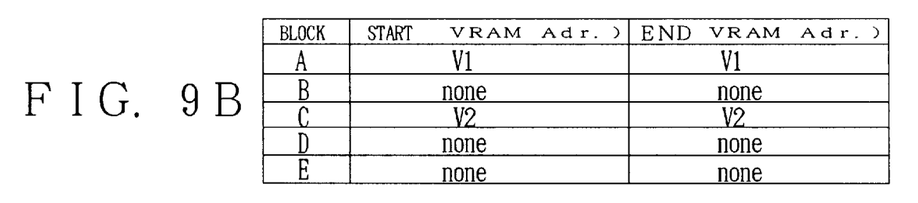
Figure 10B:
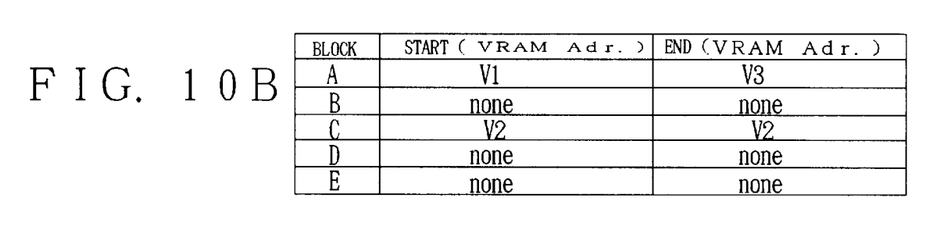

In FIGS. 8B, 9B, and 10B are shown the contents of the BLK-TBL that is stored in the work RAM 3. Among the data, for polygons, that are classified and registered in blocks A through E, the data that are registered first and the data that are registered last are employed as the start data and as the end data, and their corresponding addresses are stored in the video RAM 5.

Referring back to FIG. 7, the data, for polygons, that are transformed into the first three-dimensional coordinates are first registered in the command table in the video RAM 5 (step S41). It is presumed that the address in the video RAM 5 at which the polygon data are registered is Adr1, and the block of the classified group is blk1.

When the example shown in FIGS. 8A and 8B is referred to for the above data, for polygons, the data is for the first polygon, No. 1, and the address Adr1 that is stored in the video RAM 5 is V1. The block blk1 of the classified group belongs to block A because the distance for polygon No. 1 in the direction of the Z1 axis is 0.5.

Then, as the Data No. that corresponds to address V1 in the (VRAM Adr.) column of the command table of the video RAM 5 in FIG. 8A, a "1" is registered. It is therefore indicated that the data for the first polygon, No. 1, has been registered and is stored at address V1 in the video RAM 5.

For registration of linking destinations in the command table, all data for polygons are divided into groups, and until the data are registered, the linking destinations are determined only within the individual groups in the order of registration. Since there is no linking destination in the block A group at the time the data for the first polygon, No. 1, is registered, "none" is then entered in the Linking Destination column.

It should be noted that coordinate data of vertexes for each polygon and color data are included in the data for polygons that are to be registered and stored in the video RAM 5.

Following this, the End column that corresponds to block A for the BLK-TBL in the work RAM 3 is referred to (step S42). As the data for polygon No. 1 is the data that is first registered, the End column that is referred to is accordingly "none."

When the corresponding End column in the BLK-TBL in the work RAM 3 is referred to and "none" is indicated there, Adr1 is registered in the Start column and the End column of the BLK-TBL (step S43). As Adr1 corresponds to V1, as previously described, V1 is entered in the Start and the End column for block A, as is shown in FIG. 8B.

Tables in FIGS. 9A and 9B show the status where the data (Data No.: 2) for the second polygon, No. 2, is registered. This registration status is entirely the same as that when the data (Data No.: 1) for the first polygon, No. 1 is registered in the command table of the video RAM 5 and the address is entered in the Start and the End column of the BLK-TBL of the work RAM 3, as explained while referring to FIGS. 8A and 8B.

The only difference here is that the data for the second polygon belongs to the group in block C and is stored at address V2 in the video RAM S.

In FIG. 9A, therefore, "2" is entered as the Data No. that corresponds to address V2 in the (VRAM Adr.) column in the command table, and "none" is entered in its Linking Destination column. Further, in FIG. 9B, V2 is registered in the Start and the End column that correspond to the group in block C in the BLK-TBL of the work RAM 3.

Next, the data for the third polygon, No. 3, which is determined to belong to group A by referring to FIGS. 4 and 5, is processed. Following the procedures for the registration of a linked list in FIG. 7, first, "3" is registered as data No. that corresponds to address V3 (which corresponds to Adr1 in this case) in the (VRAM Adr.) column of the command table in the video RAM 5, as is shown in FIG. 10A (step S41). It is therefore indicated that the third polygon, No. 3, has been registered and is stored at address V3 in the video RAM 5.

Since it is determined that polygon No. 3 belongs to group A by referring to FIGS. 4 and 5, the End column for block A in the BLK-TBL in the work RAM 3 is referred to (step S 42). The state of the End column for block A that is referred to is as shown in FIG. 9B, i.e., address V1 (which corresponds to Adr2 in this case) has been registered.

After the process at step 42, therefore, the process at step 44 is performed. More specifically, at step S44, address V3, which corresponds to Adr1, is entered in the Linking Destination column for address V1, which corresponds to Adr2, of the command table in the video RAM 5(FIG. 10A). At the same time, the entry for block A in the End column of the BLK-TBL in the work RAM 3 is updated from address V1 to V3 (FIG. 10B).

The above process is repeated until the data for all the polygons are registered. A check is then performed to determine whether or not all the polygons have been registered (step S5). When all the polygons have not yet been registered, program control returns to step S2 and the above registration process is repeated.

Figure 11A:
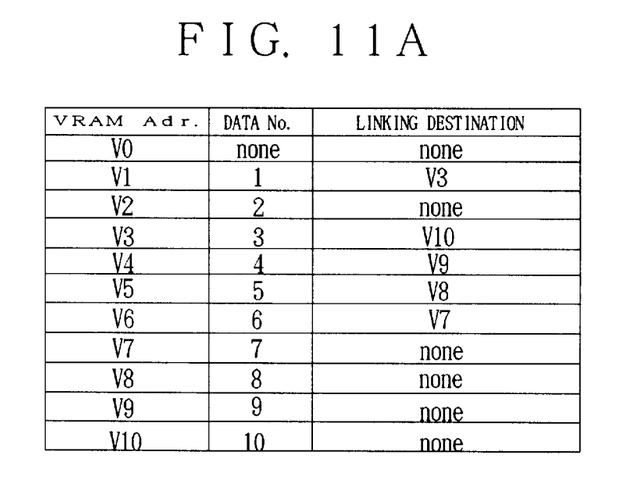
FIGS. 11A and 11B are diagrams for explaining registration state 4 of a linked list.
Figure 11B:
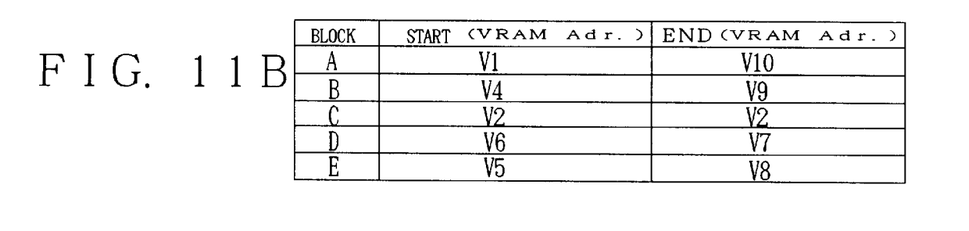

The tables in FIGS. 11A and 11B show the registration status of the data (Data No.: 10) for the last, tenth polygon, No. 10. The distance data for polygon No. 10 in the direction of the Z1 axis is 0.3, and the data for polygon No. 10 thus belong to group A (see FIG. 3).

Since there has been no registration of polygon data that belong to block A since the data for the third polygon, No. 3, was registered, address V10 is entered in the Linking Destination column that corresponds to address V3 in the video RAM 5 As the data for the tenth polygon, No. 10, are the last data to be registered, and as there is no linking destination, a linking destination address is not registered in the Linking Destination column that corresponds to address V10 in the video RAM 5 in FIG. 11B.

The entry of the End address column in the video RAM 5, which corresponds to block A in the work RAM 3 in FIG. 11B, is updated to address V10 during the process at step S44, in the same manner as was previously explained for the third polygon, No. 3.

When all the data entries for the polygons have been completed in the above described manner, the connection of the blocks to form a linked list is performed (an address for the data for a polygon that is the first that is registered in a block, the block having a distance in the direction of the Z1 axis that is shorter by one rank than the distance of the immediately preceding block, is entered in the Linking Destination column that corresponds to the address in the video RAM 5, wherein data for polygons are registered at the end of each block) (step S6).

Figure 12:
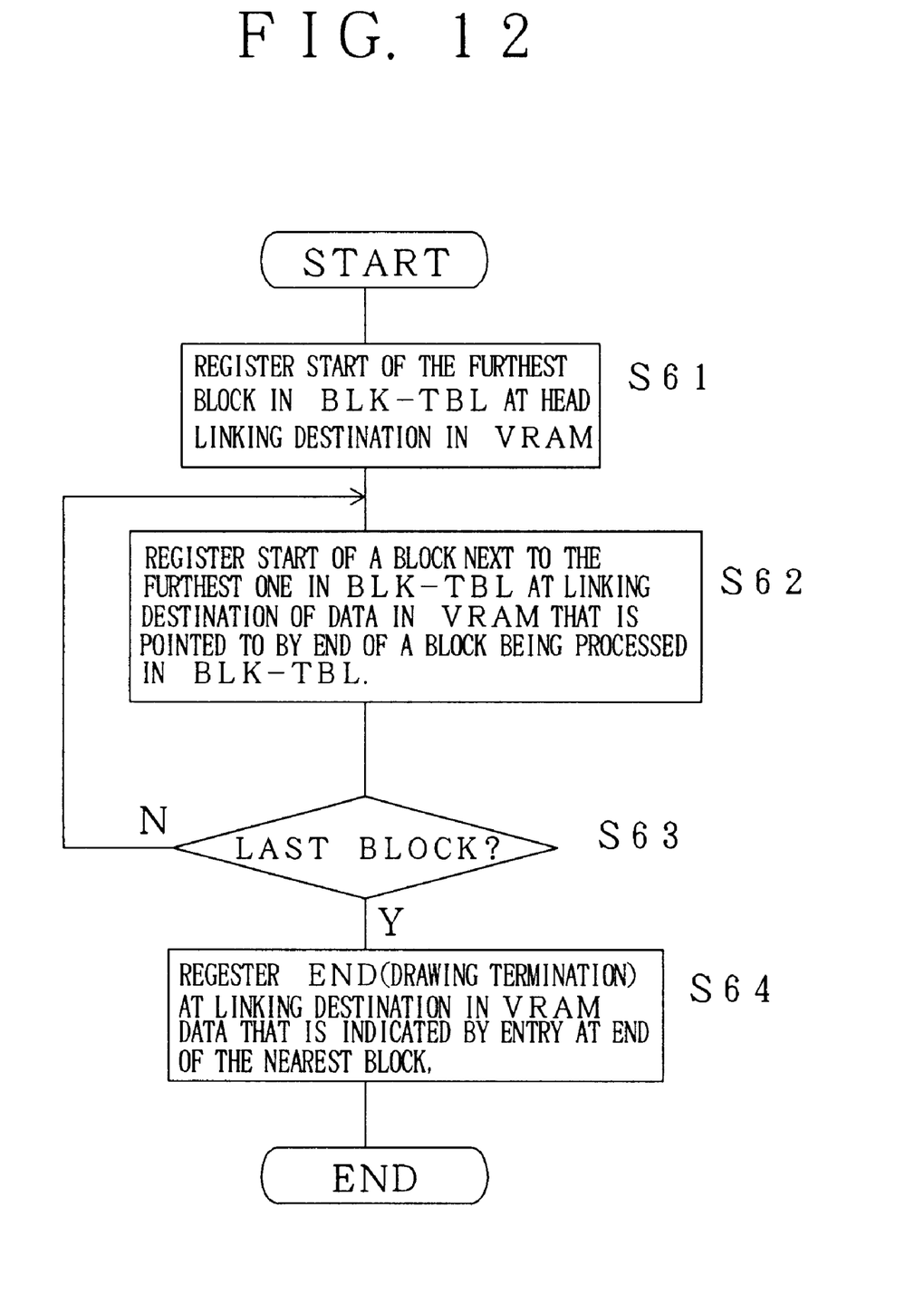
FIG. 12 is a flowchart showing a linked list connection.

FIG. 12 is the detailed flowchart for explaining the procedures involved in the formation of a linked list (step S6). For these procedures, a software process is executed by the CPU 1 by referring to the contents of the BLK-TBL in the work RAM 3.

A start address is registered for a block that has the longest distance in the direction of the Z1 axis in the BLK-TBL of the work RAM 3, at the first linking destination in a command table of the video RAM 5, that is, the Linking Destination column corresponding to the address V0(step S61).

In the BLK-TBL shown in FIG. 11B when the registration of all the polygon data is completed, the block E has the longest distance in the direction of the Z1 axis, and its corresponding start address in the video RAM 5 is V5. Therefore, address V5 is registered in the Linking Destination column for address V0, as is shown in FIG. 13.

Then, the contents of the start column for the block nearer next to the one being processed in BLK-TBL are registered at the linking Destination of data on the command table in the video RAM 5, which is pointed to by the END column of the being processed block(step S62).

More specifically, supposing that block E is being processed, the data address that is entered in the End column for block E in the BLK-TBL, and as a linking destination in the command table in the video RAM 5, is V8 (see FIG. 11B). The block nearer next to block E in the BLK-TBL is D, and its start address is V6.

Figure 13:
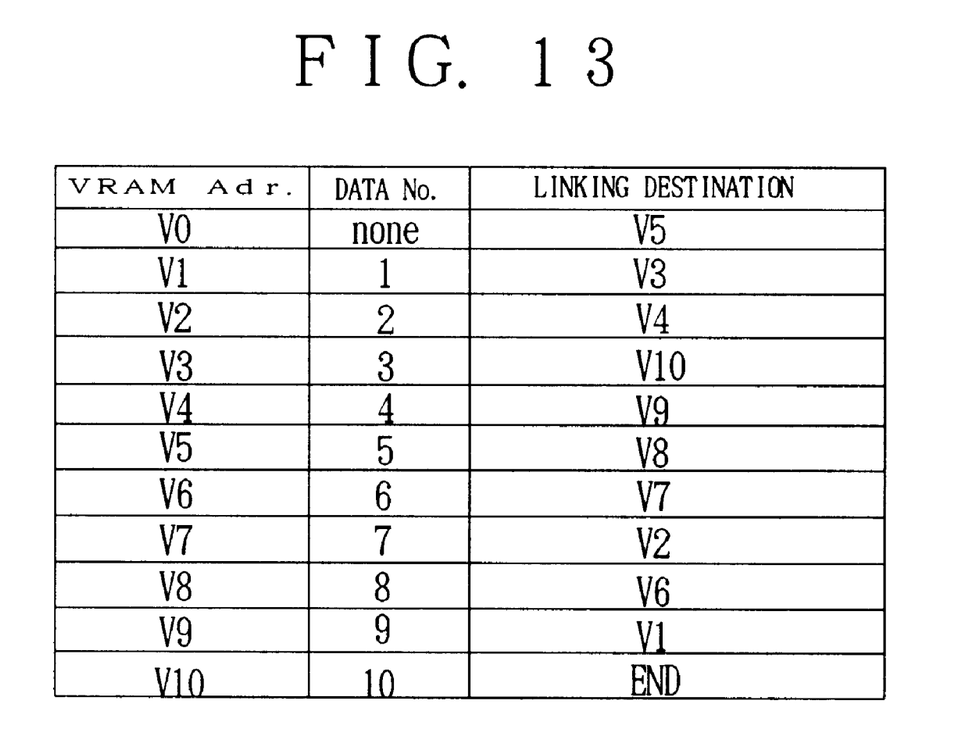
FIG. 13 is a diagram for explaining the sorting results for registered linked list.

V6 is therefore registered in the Linking Destination column that corresponds to address V8 in the video RAM 5 (see FIG. 13).

After the process has been completed up to the final block, END (termination of drawing) is registered in the Linking Destination column of the command table in the video RAM 5 for the address that is indicated in the End column of the nearest block. More specifically, as is shown in the contents of the BLK-TBL in FIG. 11B, the nearest block is block A and in the End column for block A in BLK-TBL is entered V10 (see FIG. 11B).

Thus, END (termination of the drawing) is registered for address V10 in the Linking Destination column of the command table in the video RAM 5.

A linked list, which is sequentially arranged in the descending order of the distances involved, is constructed as described above, and the sorting process is completed.

This process is also performed by the CPU 1. The connections for a linked list can be facilitated by using a jump command that the video display processor (VDP) 6 understands.

As is apparent from FIG. 13, when the sorting process is completed, address V5, at which is stored data No. 5 that is at the largest distance in the direction of the Z1 axis, is registered in the Linking Destination column that corresponds to the initial address V0 in the video RAM 5.

Following the linked list of the ordered addresses in the video RAM 5, the video display processor (VDP) 6 reads the data for polygons for one screen that are stored in the video RAM 5, and transmits pixel data, into which the data have been converted, to the frame buffer memory 7 for the drawing.

The pixel data for one screen that are drawn in the frame buffer memory 7 are repetitively read out, and converted into video signals by the video signal generator 8. The video signals are thereafter displayed on the display device 9 (step S7).

Figure 14A:
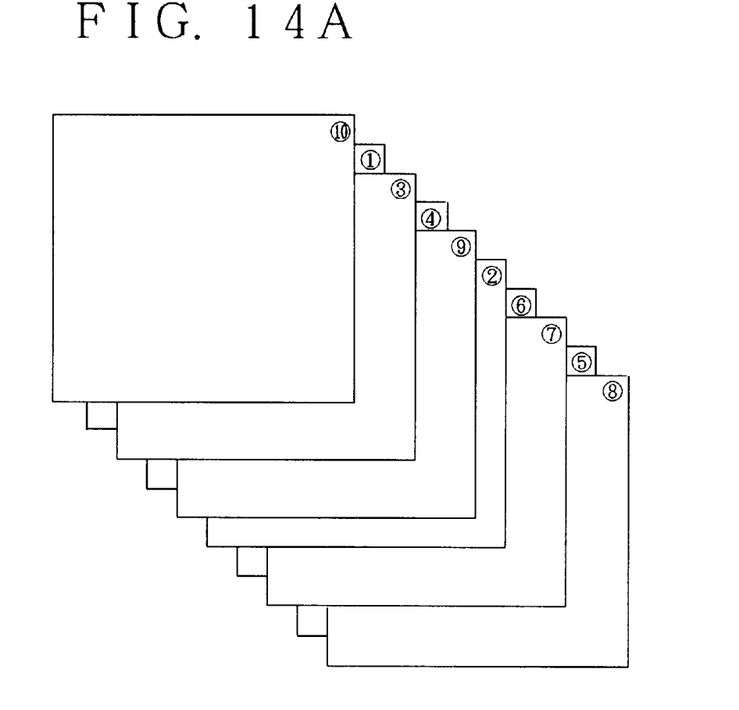
FIGS. 14A and 14B are an explanatory diagram for the drawing of polygons No. 1 through No. 10.
Figure 14B:
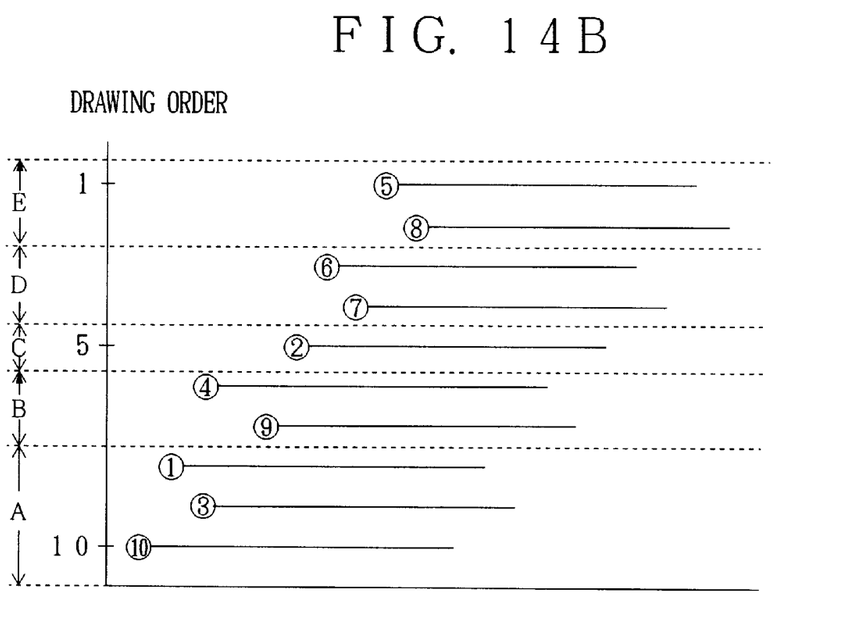

FIGS. 14A and 14B are diagrams for explaining the results when polygons are drawn in the frame buffer memory 7 in the above described manner. The diagram in FIG. 14A shows the results obtained when the polygons are drawn. The polygons are drawn in the frame buffer memory 7 beginning with the one that has the largest distance in the direction of the Z1 axis, as is shown in FIG. 14B.

In other words, polygons are drawn and partially overwritten, with the exception of No. 10, in order from No. 5 to No. 8, to No. 6, to No. 7, to No. 2, to No. 4, to No. 9, to No. 1, to No. 3, and to No. 10. As is shown in FIG. 14A, part of each of the polygons that are not over-written are displayed on the display device 9.

Furthermore, the order of drawing polygons in a frame buffer memory may be reversed according to the present invention. As explained above, as is apparent from FIG. 13, when the sorting process is completed, address V5, at which is stored data No. 5 that is at the largest distance in the direction of the Z1 axis, is registered in the Linking Destination column that corresponds to the initial address V0 in the video RAM 5. Accordingly, the video display processor (VDP) 6 reads the data for polygons for one screen, following the linked list of the reversely ordered addresses in the video RAM 5, and transmits the pixel data to the frame buffer memory 7 for drawing.

In this case, the polygons are drawn in the frame buffer memory 7 beginning with the one that has the smallest distance in the direction of the Z1 axis, as is shown in FIG. 14B. Namely, polygons are drawn in the order from No. 10 to No. 3, to No. 1, to No. 9, to No. 4, to No. 2, to No. 7, to No. 6, to No. 8, to No. 5, and it is necessary to indicate portions which have been drawn by indication flags so that the portions are not over-written with polygons that are drawn later. Accordingly, the total speed of drawing polygons in the frame buffer memory 7 becomes fast, as it will be not necessary to redraw the portions that have been already drawn.

When the present invention is applied for a video game machine, the drawing order for polygons in the frame buffer memory 7 should be discussed during the design phase for the polygon data. Drawing in the frame buffer memory 7 is performed beginning with a polygon in a group (block) that is the farthest in the direction of the Z1 axis.

The sorting of polygons based on their distances are not performed in the group. The speed of the sorting process can therefore be increased. The order in which the polygons in the group are drawn in the frame buffer memory 7 is optional. In the example shown in FIGS. 14A and 14B, the polygons are first divided into groups and then drawn in the frame buffer memory 7 by following the order in which the polygons are registered. However, the polygons in the group may be drawn in the opposite order to that in which the grouped polygons are registered.

As described above, according to the embodiment, while the conventional sorting method cannot determine the order for the polygons that are arranged in the direction of the Z1 axis unless all the data are prepared, the present invention merely determines which group each polygon belongs to and then registers it. It is therefore possible to sequentially determine the order in the direction of the Z1 axis for data that is to be processed.

Therefore, time required for sorting can be shortened and also the capacity of RAM is enough to be only for one polygon, that is used to store polygon data after the coordinates are transformed.

Especially when a DSP or a plurality of processors is employed, parallel processing can be performed.

In addition, according to the present invention, data to be drawn are registered in a video RAM, a block table is prepared in a work RAM, and then a linked list is formed by using hardware jump commands so that a sorting process can be performed, while polygon drawing commands are generated.

The above described embodiment has been provided for the explanation of the present invention; the present invention, however, is not limited to this embodiment. Variations based on ideas that are common to the present invention also fall within the scope of the present invention.

What is claimed is:

1. A method of enabling the display of video images from data read into a frame buffer memory, the data represented by an integrated assembly of a plurality of polygons comprising the steps of:

providing a program containing data which can be represented by an integrated assembly of a plurality of polygons;

transforming polygon coordinates from the program into three-dimensional coordinates;

sorting the three-dimensional coordinates of the polygons into groups relative to distances between a predetermined origin and a plurality of vertexes of the individual polygons;

listing the sorted groups of polygons in a table based on a distance from the predetermined origin to the vertexes;

first linking the groups as beginning with a group including polygons that have the greatest distance between the predetermined origin and the one of the vertexes by linking two polygons, one of which is first sorted into a group and the other of which is last sorted into the other group;

second linking polyons sorted in each of the plurality of groups, as beginning with a first polygon that is first sorted in a corresponding group in order directed to a second polygon that is last sorted in the corresponding group; and writing into the frame buffer memory the data for the video images in the order listed and linked in the table.

2. The method of claim 1 wherein the sorting of the three-dimensional coordinates of the polygons is based on the average value of the distances between the predetermined origin and the plurality of vertexes of the individual polygons on a Z axis of an XYZ coordinate system.

3. The method of claim 1 wherein the sorting of the three-dimensional coordinates of the polygon is based on the shortest distance value for a vertex on a Z axis of an XYZ coordinate system.

4. A method for sorting and drawing a plurality of polygons in a memory, comprising the steps of:

sorting the plurality of polygons, each of which has vertexes of first three-dimensional coordinates, into a plurality of groups relative to distance between a predetermined origin and one of the vertexes of individual polygons;

first linking the plurality of groups, as beginning with a group including polygons that have the greatest distance between the predetermined origin and the one of the vertexes in order of decreasing distance from the predetermined origin by linking two polygons, one of which is first sorted into a group and the other of which is last sorted into the other group; and second linking polygons sorted in each of the plurality of groups, as beginning with a first polygon that is first sorted in a corresponding group in order directed to a second polygon that is last sorted in the corresponding group.

5. The method according to claim 4, wherein said plurality of polygons that include said coordinate values of said first three-dimensional coordinates are obtained by transforming a plurality of polygons that include coordinate values of second three-dimensional coordinates different from said first dimensional coordinates.

6. The method according to claim 5, wherein said predetermined origin is an imaginary view point, which is represented by the first three-dimensional coordinates of a game player.

7. The method according to claim 4, further comprising the step of drawing the plurality of polygons in the memory according to the order of linking the groups in the step of first linking and the order of linking the polygons in each of the groups in the step of second linking.

8. The method according to claim 4, further comprising the step of drawing the plurality of polygons in the memory according to the order of linking the groups in the step of first linking and the opposite order of linking the polygons in each of the groups in the step of second linking.

9. A method for sorting and drawing a plurality of polygons in a memory, comprising the steps of: sorting the plurality of polygons, each of which has vertexes of first three-dimensional coordinates, into a plurality of groups relative to distance between a predetermined origin and one of the vertexes of individual polygons;

first linking the plurality of groups, as beginning with a group including polygons that have the shortest distance between the predetermined origin and the one of the vertexes in order of increasing distance from the predetermined origin by linking two polygons one of which is first sorted into a group and the other of which is last sorted into the other group; and second linking polygons sorted in each of the plurality of groups, as beginning with a first polygon that is first sorted in a corresponding group in order directed to a second polygon that is last sorted in the corresponding group.

* * * * *